(12) United States Patent
Gonzalez

(10) Patent No.: US 11,968,278 B2
(45) Date of Patent: Apr. 23, 2024

(54) METHOD AND SYSTEM FOR DECENTRALIZED MESSAGE HANDLING FOR DISTRIBUTED COMPUTING ENVIRONMENTS

(71) Applicant: Salesforce, Inc., San Francisco, CA (US)

(72) Inventor: Mariano Luis Gonzalez, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/159,065

(22) Filed: Jan. 26, 2021

(65) Prior Publication Data

US 2022/0239754 A1    Jul. 28, 2022

(51) Int. Cl.
*H04L 67/562* (2022.01)
*G06F 9/455* (2018.01)
*H04L 45/44* (2022.01)
*H04L 67/10* (2022.01)
*H04L 67/141* (2022.01)
*H04L 67/146* (2022.01)

(52) U.S. Cl.
CPC ........ *H04L 67/562* (2022.05); *G06F 9/45558* (2013.01); *H04L 45/44* (2013.01); *H04L 67/10* (2013.01); *H04L 67/141* (2013.01); *H04L 67/146* (2013.01); *G06F 2009/4557* (2013.01)

(58) Field of Classification Search
CPC ..... H04L 67/2809; H04L 45/44; H04L 67/10; H04L 67/141; H04L 67/146; G06F 9/45558; G06F 2009/4557
See application file for complete search history.

(56) References Cited

U.S. PATENT DOCUMENTS

| | | | | |
|---|---|---|---|---|
| 7,051,070 B2 * | 5/2006 | Tuttle | ............... | H04L 45/306 707/999.01 |
| 7,730,478 B2 | 6/2010 | Weissman | | |
| 8,856,742 B2 * | 10/2014 | Branda | ............... | G06F 11/3644 717/124 |
| 10,691,374 B2 | 6/2020 | Gonzalez | | |
| 10,908,971 B1 | 2/2021 | Gonzalez et al. | | |
| 11,231,919 B2 | 1/2022 | Gonzalez | | |
| 2020/0213387 A1 * | 7/2020 | Avila | ............... | H04L 67/1002 |
| 2021/0397429 A1 | 12/2021 | Gonzalez | | |

* cited by examiner

*Primary Examiner* — Cheikh T Ndiaye
(74) *Attorney, Agent, or Firm* — Nicholson, De Vos, Webster & Elliott, LLP

(57) ABSTRACT

A method and system for message handling implemented by a first node in a distributed computing environment. The method including receiving a message including a connection identifier to identify a connection in the application layer to be utilized to send the message to a client application, parsing the connection identifier to determine a node identifier indicating a second node in the distributed computing environment that implements the connection, and forwarding the message to the second node that implements the connection by a message broker that utilizes a routing information registry to locate the second node using the node identifier, in response to the first node having a different node identifier than the node identifier of the message.

16 Claims, 6 Drawing Sheets

METHOD AND SYSTEM FOR DECENTRALIZED MESSAGE HANDLING FOR DISTRIBUTED COMPUTING ENVIRONMENTS

TECHNICAL FIELD

One or more implementations relate to the field of messaging in distributed computing environments; and more specifically, to a decentralized method of forwarding messages between nodes in a distributed computing environment to reach client applications.

BACKGROUND ART

Distributed computing environments are systems where the components are located on different networked computing devices. Cloud computing environments are computing infrastructures that provide various types of computing resources including computing power, storage, networking bandwidth, and similar resources as services. Cloud computing environments can be implemented in distributed computing environments in some cases.

Distributed computing environments can have their computing services and operations distributed over any number and variety of locations to position the computing resources in proximity to users or other entities that can interact with functions executed in the distributed computing environments. Distributed computing environments can be established to service a single organization (i.e., tenant) or can be established to service multiple organizations (i.e., multi-tenant).

Distributed computing environments provide high availability, high-capacity networking, low-cost computing resources, and similar features that support virtualization (software and hardware), and similar functionality. Functions can be executed within the distributed computing environment to enable the functions to services requests and provide resources to applications that are external to the distributed computing environment. The functions can be characterized as being implemented by 'nodes' of the distributed computing environment, where the 'nodes' are sets of computing resources assigned to the function. The nodes and functions can communicate with external applications via any type of communication protocol. In many cases, however, a given function is implemented as multiple instances each in a separate node. An external application can establish a connection with a given node to access the functions of that node. Some functions may pass information to other nodes or external applications, which requires a complicated and centralized tracking and routing of messages between the nodes to enable messages from one node to reach another node as well as applications connected to the other nodes. Such centralized tracking and routing of messages between nodes involves significant overhead, which consumes computing resources in the distributed computing environment.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for distributed smart routing. The distributed smart routing process and system enables stateful bidirectional communication in distributed computing environments. In particular, the distributed smart routing process and system enables the establishment of full duplex connections between client applications and nodes within the distributed computing environments that implement instances of functions or similar components that are deployed in the distributed computing environment.

Figure 1:
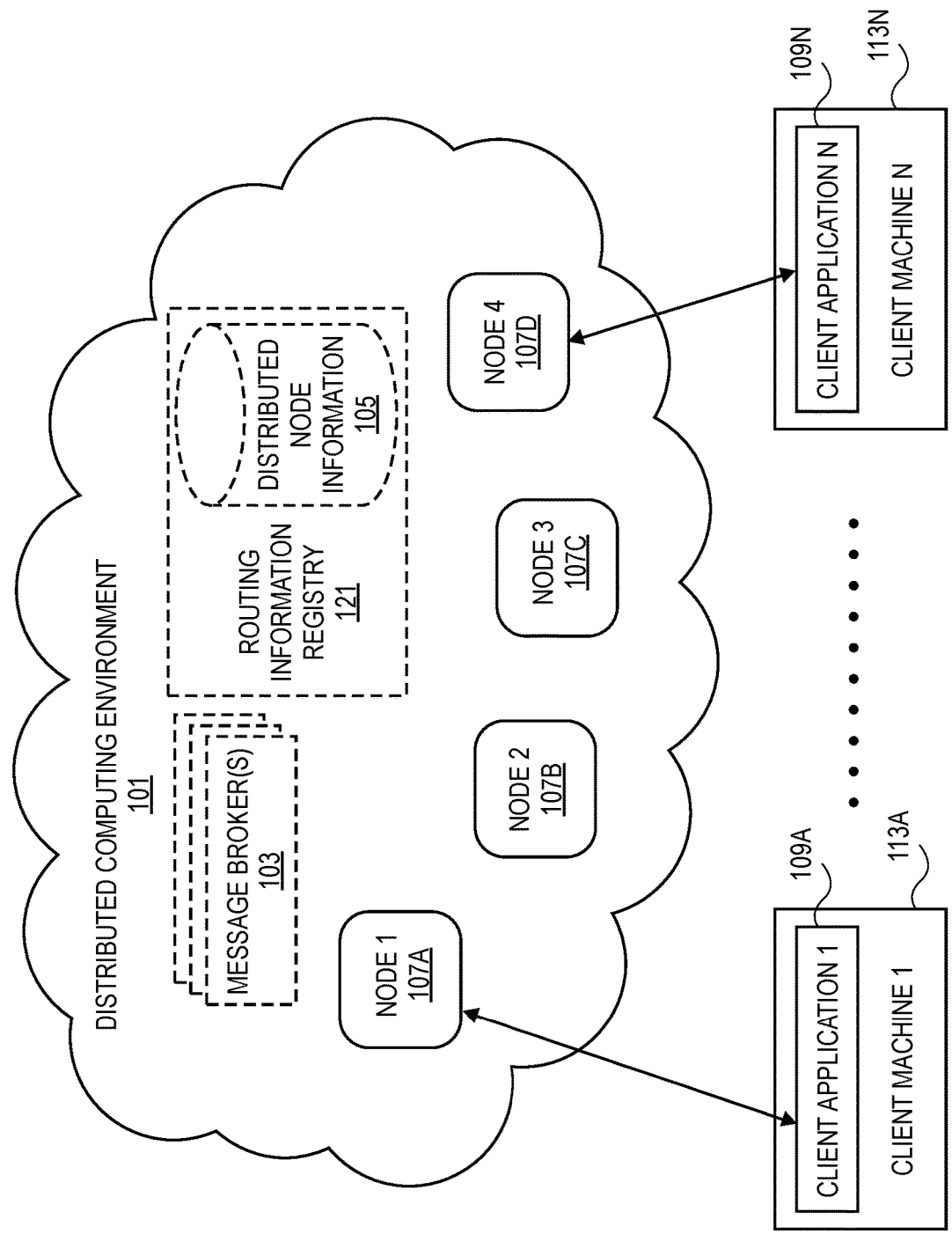
FIG. 1 is a diagram of one example implementation of a distributed computing environment that supports distributed smart routing of messages.

FIG. 1 is a diagram of one example implementation of a distributed computing environment that supports distributed smart routing of messages. In the example illustration, the distributed computing environment 101 is simplified for sake of illustration and clarity such that the electronic devices, networking, and related resources that implement the distributed computing environment 101 are abstracted to be illustrated as the cloud 101. The illustrated example, shows the distributed computing environment 101 as supporting a set of nodes 107A-D that implement instances of a function that services a set of client applications 109A-N that execute on a set of client machines 113A-N. A 'set,' as used herein refers to any positive whole number of items including one item. Any number or variety of functions and nodes can be executed at any given time on behalf of any number of separate operating entities.

The distributed computing environment 101 can be composed of any number and variety of electronic devices that provide at least computing and storage capacity for executing a set of functions (e.g., computer programs). The instances of the functions or sets of functions can be implemented as 'nodes' that are groupings of software and hardware resources allocated for the implementation of the set of functions. Similarly, the set of client machines 113A-N can be any type of electronic devices capable of executing respective client applications 109A-N. The client applications 109A-N can be any program, set of functions, or similarly organized set of processes executable by the client machines 113A-N.

The distributed computing environment 101 can be in communication with the client machines over any communication medium and via any number of intermediate machines, such as by wide area networks, the Internet, or similar telecommunications infrastructure. The client applications 109A-N can each be in communication with a respective node 107A-D via a full duplex application level connection. The connection can be based on a transmission control protocol (TCP) based connection, or similar type of connection. In some example implementations, the nodes 107A-D of the distributed computing environment establish full duplex connections. Full duplex, as used herein, refers to stateful, bidirectional, and asynchronous connections. Client applications 109A-N can establish a connection to a function operating in the distributed computing environment 101, but because the function is distributed, the connection is actually established against a particular node (e.g., Node 1 107A).

The example connection between the client application 109A and the node 107A enables full duplex communication between the client application 109A and the node 107A. However, in some cases another node in the system (e.g., Node 2 107B), needs to send a message to the client application 109A, which is connected to another node (e.g., node 1 107A). The node providing the connection to the client application 109A can be unknown to the node (e.g., node 2 107B) that is attempting to send the message.

The distributed smart routing process provides a method to allow any node (e.g., node 2 107B) to send a message to a client application connected to an unknown node (e.g., node 1 107A), without the need of a centralized routing service which keeps track of all connections in the distributed computing environment. The example implementations utilize a message broker 103 or set of message brokers. The term message broker, as used herein, does not denote a single message broker, rather, there can be a set of message brokers or a similar generic messaging system that can be distributed itself.

In the example implementations, each node (e.g., nodes 107A-D) in the distributed computing environment 1010 has a unique identifier. Any distributed process for determining a unique identifier for each node can be utilized. The identifier can be determined when each node is initialized, when the node establishes a first connection, or under similar circumstances. All client connections to be managed via the message broker and distributed smart routing system are given an identifier that is unique as well. The unique connection identifiers can include information identifying the node that is an endpoint for that connection. In one example implementation, the following format is utilized: <<NODE_IDENTIFIER>>-<<CONNECTION_IDENTIFIER>>, where the combined node and connection identifiers uniquely identify the associated connection. The node identifiers and connection identifiers can have any format, type, size, and related characteristics.

In the distributed smart routing process, the message broker 103 uses a routing information registry 121 to form a path of communication to all nodes. This routing information registry 121, or similar mechanism, contains relevant node information 105 and/or other relevant information for routing messages to nodes identified by the unique identifier. Any connection distribution mechanism can be utilized, and examples of the routing information registry 121, node and connection information 105 and message broker 103 are provided herein by way of example and not limitation. All nodes 107A-D are capable of querying, listing, or similarly determining the connections available at any given time using the available connection distribution mechanism.

Figure 2:
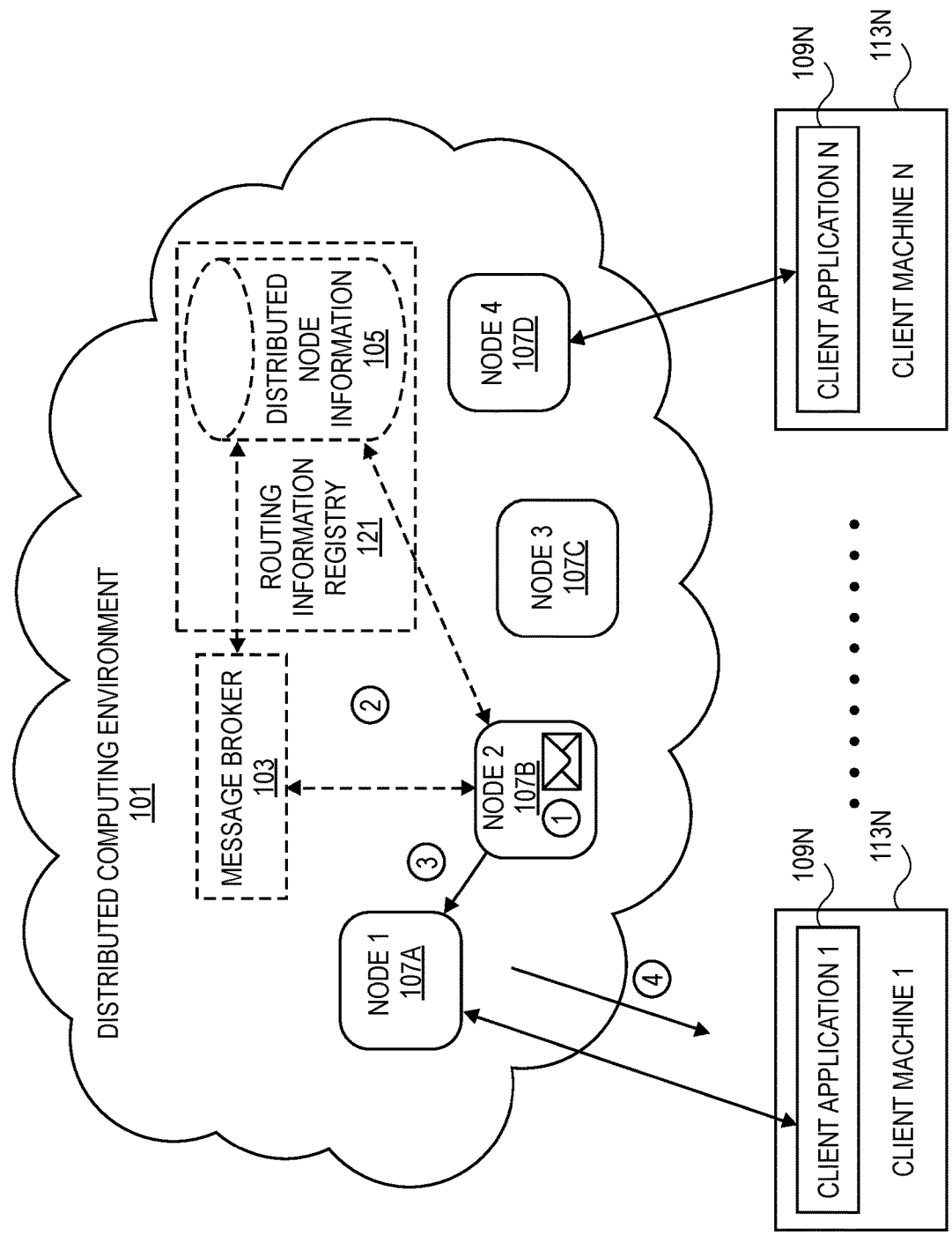
FIG. 2 is a diagram of a further example of the operation of the distributed mart routing process according to some example implementations.

FIG. 2 is a diagram of a further example of the operation of the distributed mart routing process according to some example implementations. Nodes 107A-D in the distributed computing environment can generate or receive messages that are to be sent to client applications 109A-N. The messages can have any format or content and can be generated by the functions of the associated nodes or received from other nodes or aspects of the distributed computing environment 101. When any given node (e.g., node 2 107B) attempts to send a message to a client application using a particular connection, the node first parses the unique connection identifier of the message to determine if the node identifier portion of the unique connection identifier matches the node identifier for the processing node (e.g., does the node identifier identify node 2 107B in this example case). If the node identifier of the message matches the node identifier of the processing node, then the processing node sends the message using a connection identified by the connection identifier portion of the unique connection identifier. The connection identifier portion of the unique connection identifier can identify the connection to be utilized using any locally unique identification mechanism.

If the node identifier of the message does not match the node identifier of the processing node, then the processing node can forward the message through a message broker 103 to another node that is associated with the connection. The originating node (e.g., node 2 107B) can provide the message including the unique connection identifier to the message broker 103. In some implementations, the message broker 103 broadcasts the message to all the other nodes and lets them parse the unique connection identifier to determine if the node identifier therein matches the respective node. In other implementations, the message broker can have a smarter routing mechanism that can examine the unique connection identifier and send the message to the specific target node (e.g., by maintaining information 105 about available nodes, connections, or similar information in a storage structure). In either case, all nodes 107A-D are unaware of each other and only connected through the intermediary message broker. However, in some possible implementations, the message broker functions and node or connection information 105 can be distributed either or as part of the nodes or similarly associated with the nodes.

The message broker 103 delivers the message to a set of target nodes that include at least one target node. Each recipient parses the unique connection identifier, in particular the node identifier, to determine whether that node is able to send the message to a client application. In some implementations, the message broker or the nodes can support the use of system wide broadcasts of the messages to all client applications (i.e., sending a copy of each message to all nodes in the distributed computing environment 101, which then forward the message on all of the connections of the respective node). In some example implementations, the system wide broadcast can be achieved by defining a general node identifier (e.g., the * character, or the "ALL" string), which indicates that all nodes should send the message to all client applications. This feature is useful in distributed computing environments (e.g., in either a standalone cluster or simply a multi-worker deployment environment) in which it is needed to send/broadcast messages to a set of peers, but there is no guarantee that the particular instance tasked with the job is the one which holds the proper connection.

For example, in a case where a restaurant chain is trying to implement online ordering this mechanism can be useful. In this example, each time an order is placed, a legacy system puts a message into a Java Message Service (JMS) queue. That message contains the order and the identifier of the store in which the customer will pick up the order. In this example, an application is listening to that queue and is deployed in the distributed computing environment 101. Each of the nodes of the distributed computing environment will hold a random list of connections (for example, Web Socket connections), one per store, which are connected by client applications 109A-N. Because the specific stores to which each node 107A-D is connected is random (due to reconnection, nodes crashing, and similar causes), there is no guarantee that the node that gets the (e.g., JMS) message is the one that actually holds the appropriate connection (e.g., Web Socket connection) to that particular store and associated client application. These types of scenarios (and others, which do not necessarily include the use of a message broker 103) can be handled by centralized architectural solutions that have considerable overhead and consume significant resources in the distributed computing environment 1010.

The example implementations of distributed smart routing provide a solution that provides an out of the box solution which has less overhead. When enabled the distributed smart routing system and process is implemented by a distributed computing environment 101, the connector or similar function of the distributed computing environment or each node therein generates a unique instance identifier for each node, and uses a distributed storage to keep mapping information that correlates each connection (e.g., sockets) to the associated node instance. The distributed smart routing process and system can also create a distributed virtual machine queue for each node identifier. In some implementations, a second routing information registry can be established for group subscriptions of each node.

When a node receives a message to send/broadcast, the node will check if it is the node that currently owns the target connection (e.g., target socket). If the node does not own the target connection, then the node sends the message to the message broker which will parse the connection id to obtain the node identifier. It will then query the routing information registry to trace the correct path of communication to forward the message to the node that is associated with the target connection. In some implementations, the sending node or a separate message broker can then publish a message to the target node virtual machine queue. The target node will check the virtual machine queue and send the message to the target client application. In some implementations, since errors are asynchronous, the errors will be handled in the target node, not the node that posted the message to the virtual machine queue.

Figure 5:
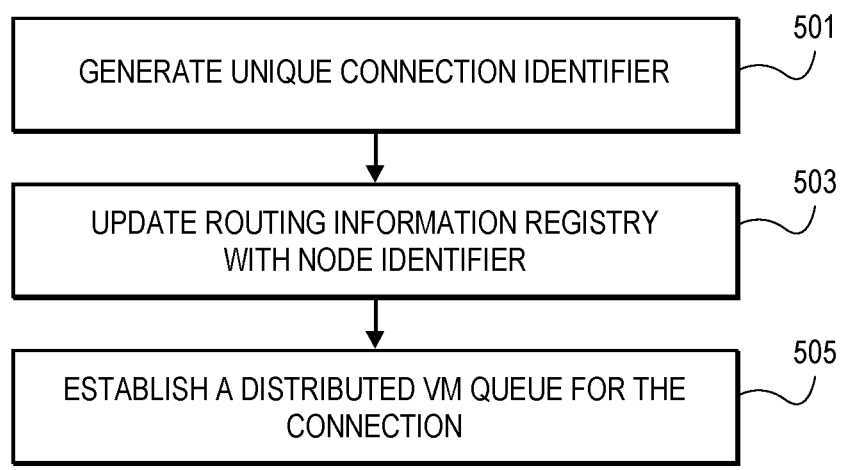
FIG. 5 is a flow diagram illustrating a process for establishing a connection by a node according to some example implementations.

In some implementations, the distributed smart routing feature will auto-enable when in a cluster mode. If an administrator chooses to manage the routing of messages using other mechanisms, then the administrator can disable the distributed smart routing. The flow diagrams of FIGS. 3 and 5 provide example implementations of the distributed smart routing, where each flow diagram describes an aspect as it is implemented by a given component (e.g., node or message broker).

Figure 3:
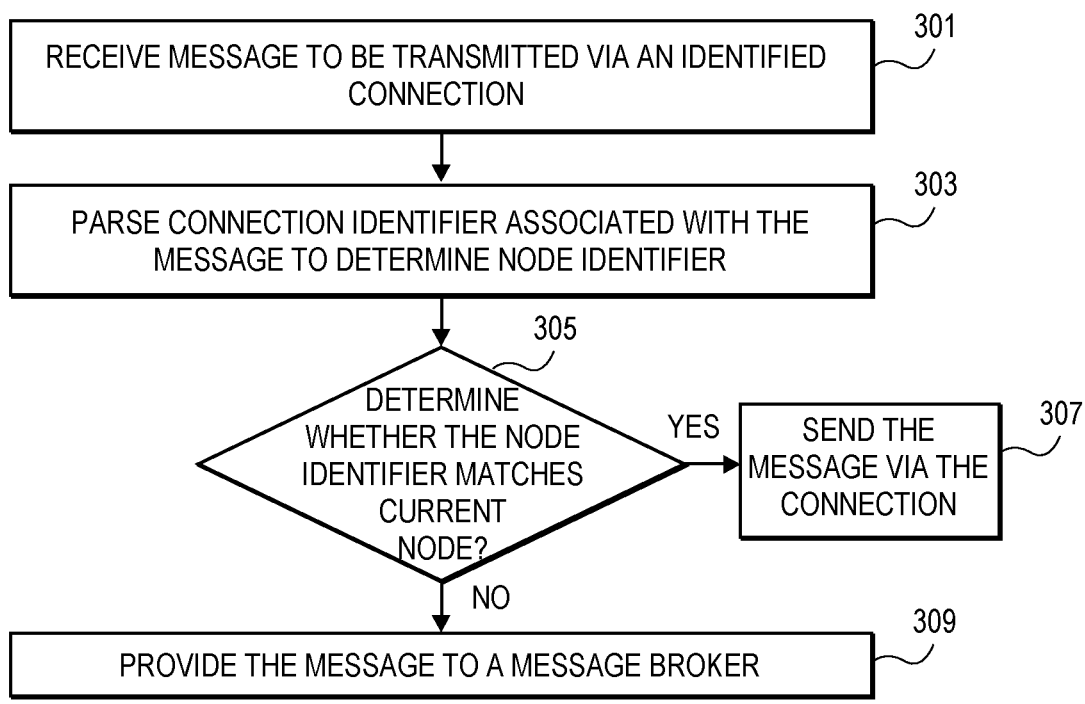
FIG. 3 is a flow diagram illustrating a process for message handling by the nodes according to some example implementations.

FIG. 3 is a flow diagram illustrating a process for message handling by the nodes according to some example implementations. The nodes can trigger the distributed smart routing process in response to receiving a message (Block 301). The message can be generated by a function of the processing node, received from another node, or similarly obtained. The message includes a unique connection identifier. The unique connection identifier can include an identifier for a node that controls or owns a target connection through which a target client application can be reached. To identify the target node, the processing node can parse the unique connection identifier to obtain a node identifier (Block 303). The processing node then compares the node identifier of the message with the identifier of the processing node (Block 305). If the node identifier of the message matches the node identifier of the node, then the node identifies the connection using the connection identifier portion of the unique connection identifier and sends the message to a target client application via the connection. If the node identifier of the message does not match the identifier of the processing node, then the node forwards the message to a message broker to handle. In some implementations, the message can be provided to the message broker by writing the message to a queue monitored or managed by the message broker.

In some implementations, the message broker is a discrete component of a distributed computing environment. In other implementations, the message broker is a distributed function that is implemented as part of the nodes or similar components of the distributed computing environment.

Figure 4:
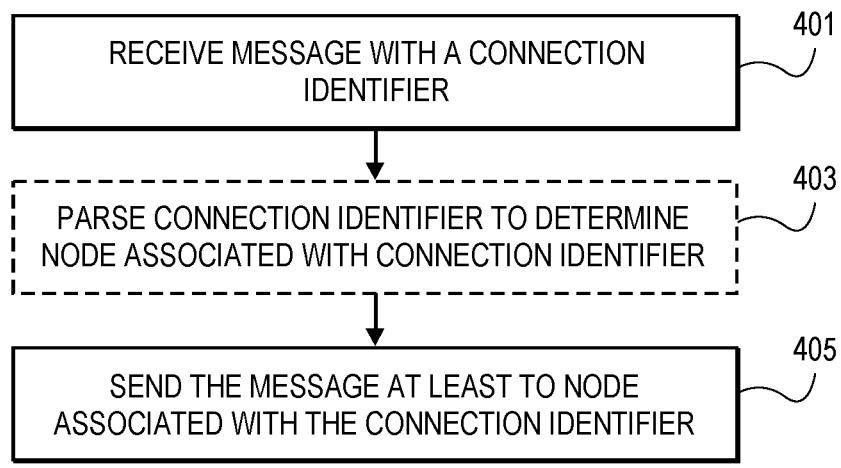
FIG. 4 is a flow diagram illustrating a process for message handling by a message broker according to some example implementations.

FIG. 4 is a flow diagram illustrating a process for message handling by a message broker according to some example implementations. The message broker can initiate message handling in response to receiving a message from a node or other source in the distributed computing environment (Block 401). The message can be in a queue monitored by the message broker or similarly received. The message broker can parse the unique connection identifier, specifically a node identifier, in the received message (Block 403). The node identifier can be utilized to determine a destination node in some implementations. The node identifier can be searched in a data structure of known nodes and identifiers, which enables the message broker to then forward the message to the target node (Block 405). In other implementations, the message broker can broadcast the message to each of the nodes. In some cases, a broadcast can also be specified by a node identifier in the message, which can indicate that the message is to be broadcast to all nodes and/or to all client applications.

FIG. 5 is a flow diagram illustrating a process for establishing a connection by a node according to some example implementations. As each node establishes connections with client applications, as each node is initiated, or under similar triggering circumstances, the node may register or advertise the information needed to forward messages to that node. The node can begin with the generation of a node identifier. In cases where the process is responsive to establishing a connection, a unique connection identifier can be generated including the node identifier and a local connection identifier (Block 501). The node identifier and/or unique connection identifier can be provided to a distributed connection storage (e.g., the routing information registry) either directly by the node or via providing the information to the message broker (Block 503). Similarly, a distributed virtual machine queue for each connection can be established either by the node initiating the connection or by the message broker (Block 505). In other implementations, a message broker can utilize a shared queue for the handling of messages to be processed by the message broker.

The distributed smart routing process and system has advantages over the prior art that include that the distributed smart routing is specifically aimed at distributed systems which hold full duplex connections to other systems. The distributed smart routing is decentralized; there is no centralized controller entity performing routing logic across nodes. The message brokers are agnostic of the domain on which they are being used in. Different messaging patterns are supported by the distributed smart routing. Nodes do not need to be aware of each other or even share the same network to utilize the distributed smart routing. The intermediate message broker can either be transient or persistent, allowing for different replay and retry strategies. The distributed smart routing process and system allows for horizontal scalability and supports individualized and broadcast messages.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 6A:
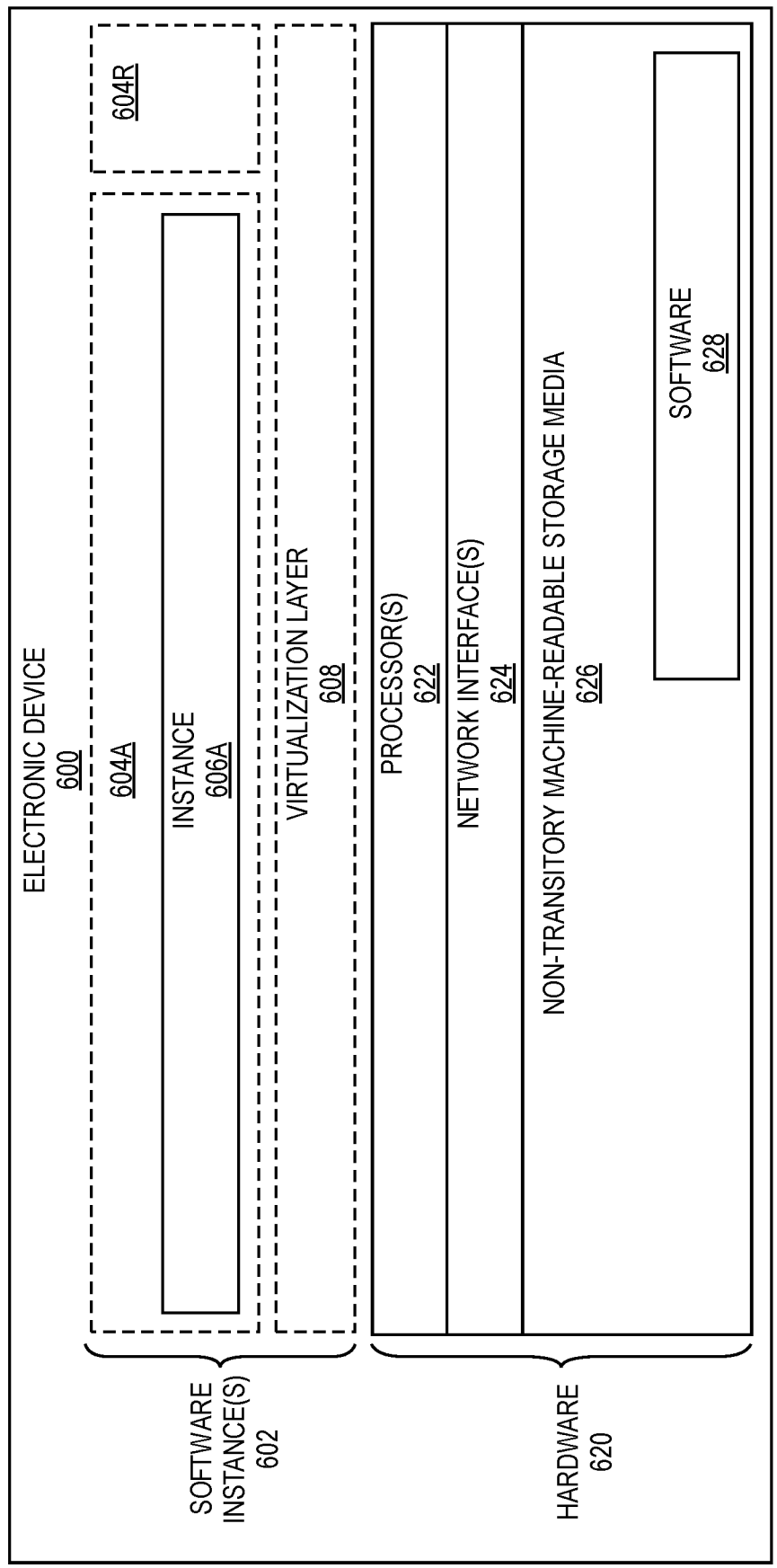
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and non-transitory machine-readable storage media 626 having stored therein software 628 (which includes instructions executable by the set of one or more processor(s) 622). Each of the previously described end user clients and the distributed smart routing service may be implemented in one or more electronic devices 600. In one implementation: 1) each of the end user clients is implemented in a separate one of the electronic devices 600 (e.g., in user electronic devices operated by users where the software 628 represents the software to implement end user clients to interface with the distributed smart routing service (e.g., a web browser, a native client, a portal, a command-line interface, and/or an application program interface (API) based upon protocols such as Simple Object Access Protocol (SOAP), Representational State Transfer (REST), etc.)); 2) the distributed smart routing service is implemented in a separate set of one or more of the electronic devices 600 (e.g., a set of one or more server electronic devices where the software 628 represents the software to implement the distributed smart routing service); and 3) in operation, the electronic devices implementing the end user clients and the distributed smart routing service would be communicatively coupled (e.g., by a network) and would establish between them (or through one or more other layers) connections for submitting message to the distributed smart routing service and returning message to the end user clients. Other configurations of electronic devices may be used in other implementations (e.g., an implementation in which the end user client and the distributed smart routing service are implemented on a single electronic device 600).

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 6B:
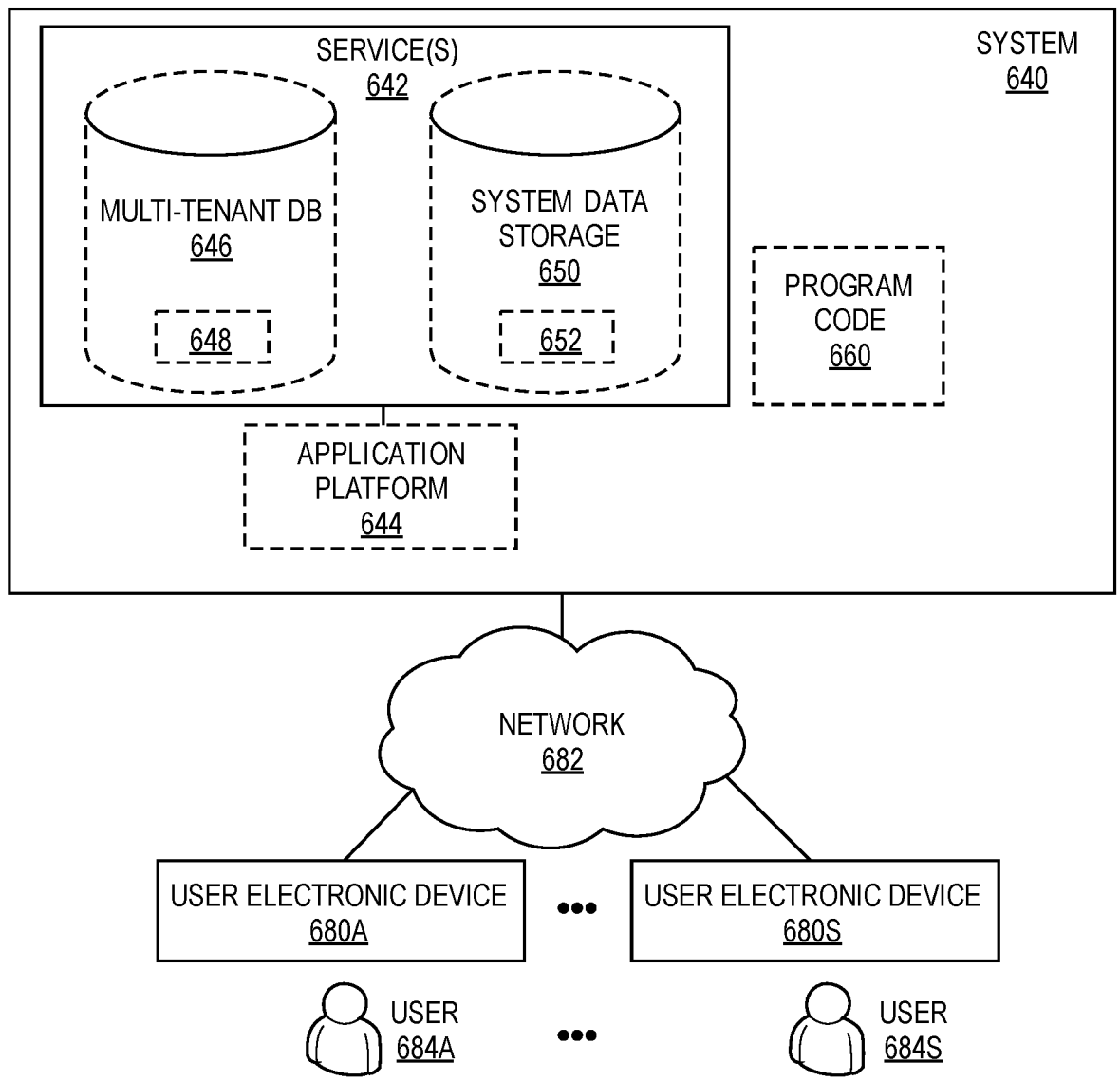
FIG. 6B is a block diagram of an environment where a distributed smart routing process may be deployed, according to some implementations.

FIG. 6B is a block diagram of an environment where a distributed smart routing service may be deployed, according to some implementations. A system 640 includes hardware (a set of one or more electronic devices) and software to provide service(s) 642, including the distributed smart routing service. The system 640 is coupled to user electronic devices 680A-S over a network 682. The service(s) 642 may be on-demand services that are made available to one or more of the users 684A-S working for one or more other organizations (sometimes referred to as outside users) so that those organizations do not need to necessarily be concerned with building and/or maintaining a system, but instead makes use of the service(s) 642 when needed (e.g., on the demand of the users 684A-S). The service(s) 642 may communication with each other and/or with one or more of the user electronic devices 680A-S via one or more Application Programming Interface(s) (APIs) (e.g., a Representational State Transfer (REST) API). The user electronic devices 680A-S are operated by users 684A-S.

In one implementation, the system 640 is a multi-tenant cloud computing architecture supporting multiple services, such as distributed smart routing services, a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 640 may include an application platform 644 that enables PAAS for creating, managing, and executing one or more applications developed by the provider of the application platform 644, users accessing the system 640 via one or more of user electronic devices 680A-S, or third-party application developers accessing the system 640 via one or more of user electronic devices 680A-S.

In some implementations, one or more of the service(s) 642 may utilize one or more multi-tenant databases 646 for tenant data 648, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user electronic device 680A-S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the one or more multi-tenant database 646 and/or system data storage 650.

In some implementations, the service(s) 642 are implemented using virtual applications dynamically created at run time responsive to queries from the user electronic devices 680A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the distributed smart routing service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 640 and the user electronic devices 680A-S.

Each user electronic device 680A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 640. For example, the user interface device can be used to access data and applications hosted by system 640, and to perform searches on stored data, and otherwise allow a user 684 to interact with various GUI pages that may be presented to a user 684. User electronic devices 680A-S might communicate with system 640 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 680A-S might include an HTTP client, commonly referred to as a "browser," for sending and receiving HTTP messages to and from server(s) of system 640, thus allowing users 684 of the user electronic device 680A-S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for message handling implemented by a first node of a plurality of nodes in a distributed computing environment that includes the plurality of nodes and a message broker service separate from the plurality of nodes, the method comprising:
receiving, by the first node, a message to be sent by a target node to a client application using a connection between the client application and the target node, where the message was generated by a second node that has no connection to the client application, and where the message includes a node identifier of the target node that is to send the message to the client application;

responsive to the receiving, determining whether the node identifier corresponds to an identifier of the first node; and responsive to determining that the node identifier in the message does not correspond to an identifier of the first node, forwarding the message to the message broker service for distribution to the target node instead of forwarding the message directly to the target node.

2. The method of claim 1, further comprising:

responsive to determining that the node identifier in the message corresponds to an identifier of the first node, delivering the message to the client application using the connection.

3. The method of claim 1, wherein the message includes a connection identifier that was generated by the target node in response to establishing the connection with the client application.

4. The method of claim 3, wherein the target node further caused a routing information registry to be updated with at least the node identifier.

5. The method of claim 4, further comprising:

establishing a distributed virtual machine queue for the connection identifier to queue messages for the connection.

6. The method of claim 1, further comprising:

responsive to determining that the node identifier in the message represents a request to broadcast the message instead of identifying a target node, broadcasting the message in the distributed computing environment.

7. A non-transitory machine-readable medium that provides instructions that, if executed by a processor in an electronic device operating as a first node of a plurality of nodes, will cause said electronic device to perform operations of a method for message handling implemented in a distributed computing environment that includes the plurality of nodes and a message broker service separate from the plurality of nodes, the operations comprising:

receiving, by the first node, a message to be sent by a target node to a client application using a connection between the client application and the target node, where the message was generated by a second node that has no connection to the client application, and where the message includes a node identifier of the target node that is to send the message to the client application;

responsive to the receiving, determining whether the node identifier corresponds to an identifier of the first node; and responsive to the determining, forwarding the message to the client application using the connection when the node identifier corresponds to the identifier of first node, and otherwise forwarding the message to the message broker service for distribution to the target node instead of forwarding the message directly to the target node.

8. The non-transitory machine-readable medium of claim 7, wherein the message includes a connection identifier that was generated by the target node in response to establishing the connection with the client application.

9. The non-transitory machine-readable medium of claim 8, wherein the target node further caused a routing information registry to be updated with at least the node identifier.

10. The non-transitory machine-readable medium of claim 9, wherein the operations further comprise:

establishing a distributed virtual machine queue for the connection identifier to queue messages for the connection.

11. The non-transitory machine-readable medium of claim 7, wherein the operations further comprise:

responsive to determining that the node identifier in the message represents a request to broadcast the message instead of identifying a target node, broadcasting the message in the distributed computing environment.

12. An electronic device comprising:

a non-transitory machine-readable storage medium having stored therein code to implement a first node of a plurality of nodes in a distributed computing environment that includes the plurality of nodes and a message broker service separate from the plurality of nodes; and a processor coupled to the non-transitory machine-readable storage medium, the processor configurable to execute the code to cause the electronic device to perform operations of:

receiving, by the first node, a message to be sent by a target node to a client application using a connection between the client application and the target node, where the message was generated by a second node that has no connection to the client application, and where the message includes a node identifier of the target node that is to send the message to the client application;

responsive to the receiving, determining whether the node identifier corresponds to an identifier of the first node; and responsive to the determining, forwarding the message to the client application using the connection when the node identifier corresponds to the identifier of first node, and otherwise forwarding the message to the message broker service for distribution to the target node instead of forwarding the message directly to the target node.

13. The electronic device of claim 12, wherein the operations include generating a connection identifier in response to the first node establishing the connection with the client application.

14. The electronic device of claim 13, wherein the operations include causing a routing information registry to be updated with at least the node identifier in response to the first node establishing the connection with the client application.

15. The electronic device of claim 14, wherein the operations include establishing a distributed virtual machine queue for the connection identifier to queue messages for the connection.

16. The electronic device of claim 12, wherein the operations include:

responsive to determining that the node identifier in the message represents a request to broadcast the message instead of identifying a target node, broadcasting the message in the distributed computing environment.

* * * * *